United States Patent
P et al.

(10) Patent No.: US 12,403,931 B2
(45) Date of Patent: Sep. 2, 2025

(54) VEHICULAR DRIVER MONITORING SYSTEM

(71) Applicant: Magna Electronics Inc., Auburn Hills, MI (US)

(72) Inventors: Ramallingeswara Rao P, Andhra Pradesh (IN); Krishnanand Hindoddi, Karnataka (IN)

(73) Assignee: Magna Electronics Inc., Auburn Hills, MI (US)

( * ) Notice: Subject to any disclaimer, the term of this patent is extended or adjusted under 35 U.S.C. 154(b) by 140 days.

(21) Appl. No.: 18/535,183

(22) Filed: Dec. 11, 2023

(65) Prior Publication Data

US 2024/0190456 A1 Jun. 13, 2024

Related U.S. Application Data

(60) Provisional application No. 63/387,104, filed on Dec. 13, 2022.

(51) Int. Cl.
*B60W 50/16* (2020.01)
*B60W 30/165* (2020.01)
*B60W 40/04* (2006.01)
*B60W 40/09* (2012.01)
*B60W 40/105* (2012.01)
(Continued)

(52) U.S. Cl.
CPC .......... *B60W 50/16* (2013.01); *B60W 30/165* (2013.01); *B60W 40/04* (2013.01); *B60W 40/09* (2013.01); *B60W 40/105* (2013.01); *B60W 40/107* (2013.01); *G06V 10/774* (2022.01); *G06V 20/597* (2022.01); *G06V 40/10* (2022.01); *B60W 2040/0818* (2013.01); *B60W 2050/143* (2013.01); *B60W 2050/146* (2013.01); *B60W 2420/403* (2013.01); *B60W 2540/229* (2020.02); *B60W 2554/406* (2020.02); *B60W 2554/802* (2020.02)

(58) Field of Classification Search
CPC .... B60W 50/16; B60W 30/165; B60W 40/04; B60W 40/09; B60W 40/105; B60W 40/107; B60W 2040/0818; B60W 2050/143; B60W 2050/146; B60W 2420/403; B60W 2540/229; B60W 2554/406; B60W 2554/802; G06V 10/774; G06V 20/597; G06V 40/10
See application file for complete search history.

(56) References Cited

U.S. PATENT DOCUMENTS 5,550,677 A 8/1996 Schofield et al.
5,670,935 A 9/1997 Schofield et al.
(Continued)

*Primary Examiner* — Mohamed Barakat
(74) *Attorney, Agent, or Firm* — HONIGMAN LLP

(57) ABSTRACT

A vehicular driver monitoring system includes a camera disposed at an interior cabin of a vehicle and that views at least a head region of a driver of the vehicle. The system, based on processing of image data captured by the camera, determines a current behavior of the driver. The system determines a threshold level of distraction associated with the current behavior based on a current operating condition of the vehicle. The system, while the driver is operating the vehicle and based on the determined current behavior and the determined threshold level of distraction, determines that the driver is distracted. Responsive to determination that the driver is distracted, an alert is generated.

28 Claims, 1 Drawing Sheet

(51) Int. Cl.
  *B60W 40/107* (2012.01)
  *G06V 10/774* (2022.01)
  *G06V 20/59* (2022.01)
  *G06V 40/10* (2022.01)
  *B60W 40/08* (2012.01)
  *B60W 50/14* (2020.01)

(56) References Cited

U.S. PATENT DOCUMENTS

| | | | |
|---|---|---|---|
| 5,760,962 | A | 6/1998 | Schofield et al. |
| 8,258,932 | B2 | 9/2012 | Wahlstrom |
| 8,922,422 | B2 | 12/2014 | Klar et al. |
| 10,017,114 | B2 | 7/2018 | Bongwald |
| 10,099,614 | B2 | 10/2018 | Diessner |
| 10,671,868 | B2 | 6/2020 | Koravadi |
| 10,703,204 | B2 | 7/2020 | Hassan et al. |
| 10,836,309 | B1 * | 11/2020 | Trundle ............... G08G 1/0116 |
| 10,850,746 | B2 | 12/2020 | Marti et al. |
| 10,963,741 | B2 | 3/2021 | Ambeck-Madsen et al. |
| 11,167,771 | B2 | 11/2021 | Caron et al. |
| 11,341,671 | B2 | 5/2022 | Lu et al. |
| 11,352,013 | B1 * | 6/2022 | Srinivasan ............ G06V 20/44 |
| 11,433,906 | B2 | 9/2022 | Lu |
| 11,465,561 | B2 | 10/2022 | Peterson et al. |
| 11,488,399 | B2 | 11/2022 | Wacquant |
| 11,493,918 | B2 | 11/2022 | Singh |
| 11,518,401 | B2 | 12/2022 | Kulkarni |
| 11,639,134 | B1 | 5/2023 | Huizen et al. |
| 11,691,567 | B2 | 7/2023 | Huizen et al. |
| 11,780,372 | B2 | 10/2023 | Sobecki et al. |
| 11,827,153 | B2 | 11/2023 | Miller et al. |
| 2003/0181822 | A1 * | 9/2003 | Victor ................ B60W 40/09 |
| | | | 600/558 |
| 2015/0009010 | A1 | 1/2015 | Biemer |
| 2015/0015710 | A1 | 1/2015 | Tiryaki |
| 2015/0092042 | A1 | 4/2015 | Fursich |
| 2015/0158499 | A1 | 6/2015 | Koravadi |
| 2015/0294169 | A1 | 10/2015 | Zhou et al. |
| 2015/0296135 | A1 | 10/2015 | Wacquant et al. |
| 2015/0352953 | A1 | 12/2015 | Koravadi |
| 2016/0036917 | A1 | 2/2016 | Koravadi et al. |
| 2016/0137126 | A1 | 5/2016 | Fursich et al. |
| 2016/0209647 | A1 | 7/2016 | Fursich |
| 2016/0221509 | A1 | 8/2016 | Takada et al. |
| 2018/0009442 | A1 | 1/2018 | Spasojevic et al. |
| 2019/0054899 | A1 | 2/2019 | Hoyos et al. |
| 2019/0210615 | A1 | 7/2019 | Caron et al. |
| 2019/0213429 | A1 | 7/2019 | Sicconi et al. |
| 2019/0232966 | A1 | 8/2019 | Prakah-Asante et al. |
| 2019/0258131 | A9 | 8/2019 | Lynam et al. |
| 2019/0367039 | A1 * | 12/2019 | Persia ................ G06V 20/597 |
| 2020/0143560 | A1 | 5/2020 | Lu et al. |
| 2020/0320320 | A1 | 10/2020 | Lynam |
| 2020/0327345 | A1 * | 10/2020 | Schumacher .......... G06V 20/58 |
| 2021/0122404 | A1 | 4/2021 | Lisseman et al. |
| 2021/0245662 | A1 | 8/2021 | Blank et al. |
| 2021/0394775 | A1 * | 12/2021 | Julian ................ G06V 20/58 |
| 2022/0204035 | A1 * | 6/2022 | Mackenzie ......... B60W 40/107 |
| 2022/0229309 | A1 | 7/2022 | Laskin et al. |
| 2022/0242438 | A1 | 8/2022 | Sobecki et al. |
| 2023/0036776 | A1 * | 2/2023 | Mussa ............... B60W 60/0016 |
| 2023/0353670 | A1 | 11/2023 | Nieri |
| 2024/0064274 | A1 | 2/2024 | Blank et al. |
| 2024/0168355 | A1 | 5/2024 | Baur |
| 2024/0383406 | A1 | 11/2024 | Sobecki |

* cited by examiner

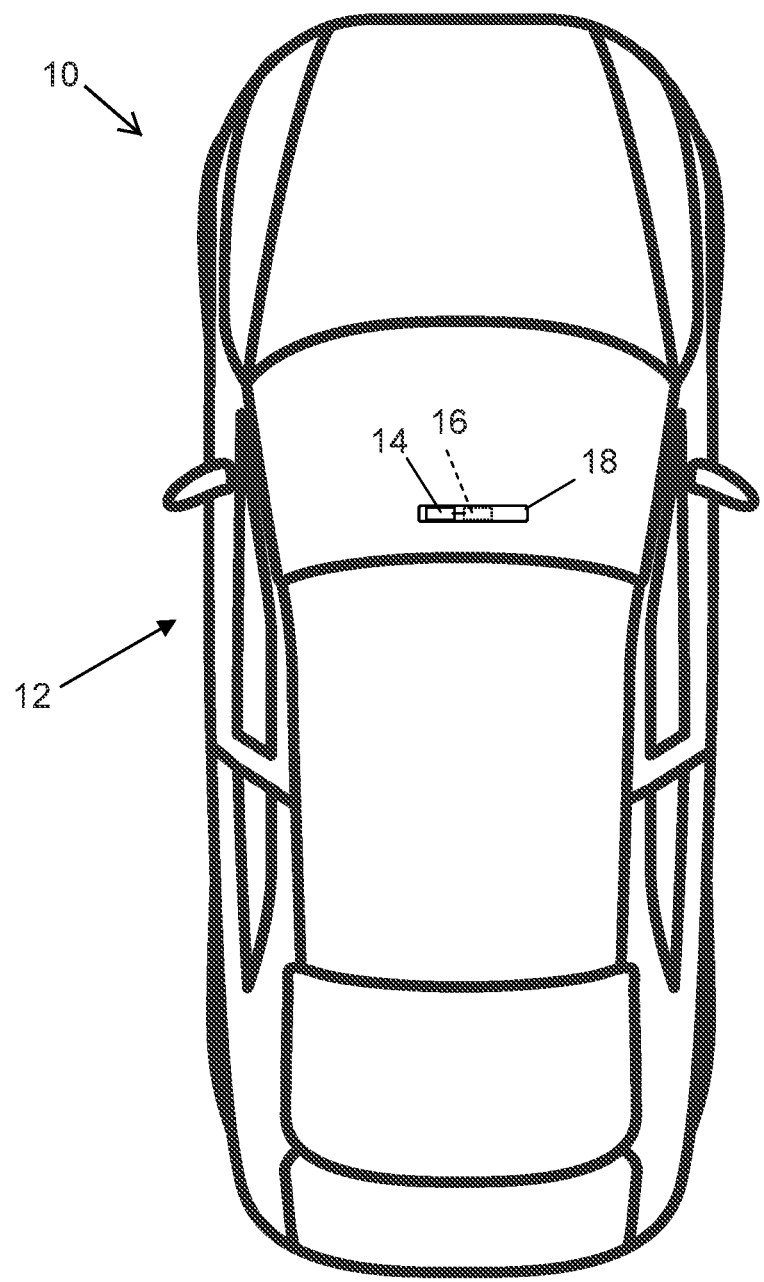

VEHICULAR DRIVER MONITORING SYSTEM

CROSS REFERENCE TO RELATED APPLICATION

The present application claims the filing benefits of U.S. provisional application Ser. No. 63/387,104, filed Dec. 13, 2022, which is hereby incorporated herein by reference in its entirety.

FIELD OF THE INVENTION

The present invention relates generally to a vehicle vision system for a vehicle and, more particularly, to a vehicle vision system that utilizes one or more cameras at a vehicle.

BACKGROUND OF THE INVENTION

Use of mobile devices, such as cellphones, while driving a vehicle is a dangerous and distracting activity for the driver that is often the cause of automotive collisions. It is known to enable use of a mobile device through systems of the vehicle, such as a communications system that utilizes a microphone and speaker at the cabin of the vehicle, via wireless connection between the vehicle and the mobile device, such as via BLUETOOTH™ connectivity.

Use of imaging sensors in vehicle imaging systems is common and known. Examples of such known systems are described in U.S. Pat. Nos. 5,949,331; 5,670,935 and/or 5,550,677, which are hereby incorporated herein by reference in their entireties.

SUMMARY OF THE INVENTION

A vehicular driver monitoring system includes a camera disposed at an interior cabin of a vehicle equipped with the vehicular driver monitoring system and viewing at least a head region of a driver of the vehicle. The camera may include a CMOS imaging array having at least one million photosensors arranged in rows and columns. An electronic control unit (ECU) includes electronic circuitry and associated software. The electronic circuitry includes an image processor for processing image data captured by the camera. Image data captured by the camera is provided to the ECU. The system, based on processing the provided captured imaged data at the ECU, determines a current behavior of the driver (such as texting or talking on a mobile device or cellphone). The system is trained using an artificial intelligence (AI) technique to identify the behavior performed by the driver. While the driver is operating the vehicle and based on the determined current behavior of the driver, the system determines that the driver is operating the vehicle while distracted. Responsive to determining that the driver is operating the vehicle while distracted, the vehicular driver monitoring system generates an alert to the driver.

These and other objects, advantages, purposes and features of the present invention will become apparent upon review of the following specification in conjunction with the drawings.

BRIEF DESCRIPTION OF THE DRAWINGS

FIG. 1 is a plan view of a vehicle with a driver monitoring camera.

DESCRIPTION OF THE PREFERRED EMBODIMENTS

A vehicle vision system and/or driver or driving assist system and/or object detection system and/or alert system and/or driver monitoring system operates to capture images exterior and/or interior of the vehicle and may process the captured image data to monitor occupants of the vehicle and/or display images and to detect objects at or near the vehicle and in the predicted path of the vehicle, such as to assist a driver of the vehicle in maneuvering the vehicle in a rearward direction. The vision system includes an image processor or image processing system that is operable to receive image data from one or more cameras and provide an output to a display device for displaying images representative of the captured image data.

Referring now to the drawings and the illustrative embodiments depicted therein, a vehicle 10 includes a driver monitoring system 12 that includes at least one interior viewing imaging sensor or camera 14, with the camera having a lens for focusing images at or onto an imaging array or imaging plane or imager of the camera (FIG. 1). The system 12 includes a control or electronic control unit (ECU) 16 that comprises electronic circuitry and associated software, with the electronic circuitry including a data processor or image processor that is operable to process image data captured by the camera or cameras (and may process image data captured by other cameras at the vehicle, such as exterior viewing cameras disposed at locations so as to have respective fields of view exterior of the vehicle) and/or may provide an output to a display device for displaying video images for viewing by the driver of the vehicle. Although shown in the illustrated embodiment as disposed at an interior rearview mirror assembly 18 of the vehicle 10, the driver monitoring camera 14 and ECU 16 may be disposed at any suitable position within the vehicle, such as at a dashboard or gauge cluster or windshield mounted electronics module or the like. The data transfer or signal communication from the camera to the ECU may comprise any suitable data or communication link, such as a vehicle network bus or the like of the equipped vehicle.

As discussed further below, the driver monitoring camera 14 captures image data representative of at least the head region of the driver as the vehicle is travelling along a road and the captured image data is processed to determine whether the driver is engaging in activity or performing an action that may result in distracted or dangerous driving. For example, the driver monitoring system 12 may be configured to determine if the driver is using a cellphone or mobile device (e.g., making a phone call or sending a text message using the mobile device), operating an infotainment system of the vehicle, directing their gaze away from the road, talking with occupants in the vehicle, and the like. When the driver is determined to be engaging in distracted driving, the system issues an alert (e.g. displaying a message at a display screen of the vehicle and/or playing an audio signal). The system may be trained using artificial intelligence (AI) algorithms to learn to identify new distracted driving actions of the driver and to more accurately determine when the driver is engaging in distracted driving.

Cellphone use while driving is common, but it is widely considered dangerous due to its potential for causing accidents due to distractions while driving. Due to the number of accidents that are related to cellphone use while driving, some jurisdictions have made the use of a cellphone while driving illegal. Many jurisdictions have enacted laws to ban handheld cellphone use. Besides completing phone calls, cellphones can also be used to read or type text messages, connect to the internet, and view videos. Activities such as texting while driving also increase the risk of an accident. Some reports indicate that cellphone use while driving may lead to as many as 1.6 million crashes each year and nearly 330,000 injuries occur each year from accidents caused by texting while driving. Some reports indicate that one out of every four accidents in India and the United States is caused by texting and driving. Some reports indicate that nine people in the United States are killed every day in crashes that are reported to involve a distracted driver.

Distracted driving can increase the chance of a motor vehicle crash. Distracted driving may be defined as any activity that could divert a person's attention away from the primary task of driving. Some reports indicate that distracted driving-related car accidents kill nine people and injure an average of 1,100 people every day. Some experts believe the number of people injured or killed in car accidents will continue to grow as more and more people turn to their phones and other technology while behind the wheel.

Thus, the driver monitoring system 12 monitors the driver and determines if the driver is performing an action that constitutes a distracted driving activity (e.g., texting while driving) or if the driver is performing an action that reduces the driver's ability to pay attention to driving (e.g., talking on the phone, adjusting climate or audio controls, or talking to occupants in the vehicle). When the driver is determined to be performing a distracted activity or an activity that reduces the driver's ability to pay attention to the road, the driver monitoring system 12 may generate an alert to the driver, such as an audio tone or message via the speakers of the vehicle or a message displayed at a display device of the vehicle, to encourage the driver to cease the activity or pay greater attention to driving the vehicle.

In determining whether the driver is driving while distracted, the driver monitoring system 12 may determine that the driver is performing a specific activity or that the activity of the driver is within a specific category, where the specific activity or category of activity is considered distracted driving. For example, the system may identify a mobile device, the driver's head and/or eyes, and the driver's hand or hands present in the captured image data and determine the action being performed based on the spatial relationship between the mobile device, driver's head and/or eyes, and/or the driver's hands. If the mobile device is positioned at or near the driver's head (such as at a left ear or right ear region of the driver's head), then the driver may be determined to be talking on the phone. If the mobile device is being held by the driver at a distance away from the driver's head (such as below the driver's head and near the driver's lap), then the driver may be determined to be texting on the phone.

Talking on the phone with the phone near the driver's head may be a less distracted activity than texting on the phone because the driver's gaze is directed away from the road while texting. The system may generate progressive alerts, based on a danger or distraction level of the determined activity. For example, the progressive alerts may generate a first signal for a low level alert corresponding to relatively minor distracted activities, and a second signal for a high level alert corresponding to relatively major distracted activities.

In other words, the system may determine the activity being performed by the driver and, based on a level of distraction associated with the activity, generate the alert to the driver. If the level of distraction associated with the activity is low or below a threshold level of distraction (e.g., if the driver is talking on the phone using a hands free device while looking at the road), then the system may not generate the alert. If the level of distraction associated with the activity is above a first threshold level of distraction (e.g., if the driver is looking at the infotainment screen while adjusting temperature controls), then the system may generate a first alert (e.g., an audible tone). If the level of distraction associated with the activity is above a higher second threshold level of distraction (e.g., if the driver is looking into the back seat to talk to an occupant in the back seat), then the system may generate a more intense, second alert (e.g., a louder audible tone or haptic feedback through the driver seat or seatbelt).

When the system generates progressive audible alerts, the higher level alert or alerts are louder or more intense or more noticeable (and thus more irritating or annoying to the driver) than the lower level alert or alerts. Similarly, when the system generates progressive visual alerts, the higher level alert or alerts include brighter or more intense illumination than the lower level alerts. Optionally, the higher level progressive visual alerts may include flashing patterns or illuminated colors that are different than the lower level alerts. For example, the higher level visual alerts may include more rapid or greater frequency flashing patterns and red or orange illuminated lights, while the lower level visual alerts may include slower flashing patterns (lower frequency) or steady illumination and green or yellow illuminated lights. When the system generates progressive haptic alerts (such as a vibrating driver seat, steering wheel, or seatbelt), the higher level alerts may include greater intensity, longer lasting, or otherwise more noticeable haptic feedback than the lower level alerts. Thus, the higher level alerts may be configured to illicit a quicker or more significant reaction from the driver performing the distracted driving action. Optionally, the system may, upon initially determining the distracted behavior, generate a lower level alert and the system may progressively increase the magnitude of the alert until the system determines that the driver has stopped performing the distracted behavior.

The system may generate progressive alerts based on progressive levels of distraction associated with the actions of the driver. That is, based on greater levels of distraction associated with the action of the driver, the system may generate higher level alerts and, based on lower levels of distraction associated with the action of the driver, the system may generate lower level alerts or no alert at all. Further, the system may generate progressive alerts based on the driver performing a distracted driving behavior for longer than threshold periods of time. For example, if the system determines that the driver is performing a distracted driving behavior for longer than a first threshold period of time, the system may generate a lower level first alert and, if the system determines that the driver is performing the distracted driving behavior for longer than a second threshold period of time (that is greater than the first threshold period of time), then the system may generate a higher level second alert.

The system may be trained using AI techniques to identify and determine different behaviors and activities of the driver. For example, the system may be fed captured image data representative of a plurality of examples of a driver texting on a cellphone and train based on the data to better recognize texting behaviors. The system may train based on image data captured by the driving monitoring camera 14 at the vehicle while the vehicle is in operation. Optionally, the system may be trained prior to being installed at the vehicle. Optionally, the system may be in wireless communication with a remote server (such as via a wireless communications module at the ECU including a wireless transmitting and receiving antenna) that communicates captured image data to the remote server for processing and training of the driver monitoring system 12. Thus, the remote server may receive captured image data from a plurality of vehicles equipped with the driver monitoring system and the driver monitoring systems of each vehicle may be trained using the collective image data.

Artificial intelligence training techniques may be employed to train the driver monitoring system to improve and/or learn other monitoring and tracking functions. For example, the system may train to improve driver eye tracking (such as to track the gaze direction of the driver to determine where and/or what the driver is viewing). Further, the system may update or adjust its ability to determine driver behavior. For example, the system may determine that the driver is holding an object near their head, but the system may be unable to identify that the object is a cellphone. Based on AI training techniques, the system may identify the object as a cellphone and, in subsequent image data processing, be able to identify other behaviors and actions (e.g., texting) of the driver based on the identification of the object as a cellphone.

In some examples, the system may monitor driver behavior and compare the driver behavior to vehicle operation parameters (e.g., a vehicle speed, acceleration, or deceleration, position of the vehicle within a lane of the road, a following distance to a leading vehicle, a determined level of traffic at the vehicle, and the like) to learn or determine or adjust whether the behavior should be categorized as a distracted behavior. In other words, the system may adjust the threshold level of distraction for triggering the alert based on the determined behavior of the driver and one or more operating conditions of the vehicle while the driver is operating the vehicle (i.e., during determination of the determined behavior). For example, the system may determine that the driver is holding a cellphone near their head (e.g., the driver is engaging in a telephone conversation), which may be categorized as a distracted behavior. However, the system may monitor vehicle operation parameters during the distracted behavior of talking on the cellphone and determine that the operation parameters are indicative of safe or non-distracted driving behaviors, such as maintaining a constant speed, maintaining the vehicle's position within a lane of the road, maintaining a following distance to a leading vehicle, maintaining a gaze direction ahead of the vehicle toward the road, little to no traffic near the vehicle, and the like. Based on determination that the vehicle operation parameters are indicative of safe or non-distracted driving while the driver is determined to be engaging in a behavior categorized as a distracted behavior (e.g., talking on the phone), the system may reduce the categorization associated with the behavior or categorize the behavior as a non-distracted behavior (i.e., increase the threshold distraction level for triggering the alert). Similarly, the system may recognize and categorize a behavior as a distracted behavior based on vehicle driving parameters indicative of unsafe or distracted driving, such as sudden acceleration or deceleration, lateral movement of the vehicle within and/or out of the lane of the road, changes in following distance to the leading vehicle, directing the driver's gaze away from the road, heavy traffic near the vehicle, and the like. That is, when driving parameters are indicative of unsafe or distracted driving, the system may reduce the threshold distraction level for triggering the alert so that alerts are more readily triggered by lower determined distraction levels of the driver.

Therefore, if the driver is performing a behavior that would otherwise be categorized as a distracted behavior, but is maintaining safe operation of the vehicle, the system may not issue an alert or issue an alert having reduced intensity. Whereas, if the driver is performing a behavior that would otherwise be categorized as not a distracted behavior, but is not performing safe operation of the vehicle, the system may issue an alert or increase intensity of the alert. The system may use AI learning techniques to recognize driver behaviors that result in safe or dangerous driving conditions to provide personalized alert thresholds.

Put another way, the system is trained using the AI learning technique to determine or categorize behaviors of the driver and to determine a threshold level of distraction associated with the behavior so that, when the behavior is detected by the system, the system may more readily determine if the distraction level of the driver exceeds the determined threshold level of distraction and that the driver is operating the vehicle while distracted. For example, the system is trained to determine the threshold level of distraction based on operating conditions of the vehicle during at least one instance of the current behavior. The instance may be at least one previous instance where the system determined that the driver was performing a behavior (e.g., the instance was during calibration of the system before installation at the vehicle or during a previous driving session of the vehicle after installation of the system at the vehicle) and the system determined one or more operating conditions of the vehicle during the behavior. Optionally, the instance may be the present instance of the behavior, where the system may adjust the threshold level of distraction for triggering the alert in real time based on the current operating conditions and/or current driving behavior of the vehicle. For example, the system may adjust the threshold level of distraction at which the alert is generated based on the current driving conditions, such as adjusting the threshold when the driver is driving in heavy traffic (such that the alert is generated responsive to a lesser degree of distraction due to the greater requisite attentiveness during such driving conditions).

Thus, the driver monitoring system captures image data representative of at least the driver head region at the interior portion or cabin of the vehicle and processes the captured image data to determine a behavior or activity or action of the driver. Based on processing the image data, the system may determine that the driver is performing a distracted behavior and generate an alert to the driver to encourage the driver to cease the distracted behavior. The system processes image data captured by the driver monitoring camera using AI techniques and processes to identify the distracted behavior.

Optionally, the driver monitoring system 12 may determine an attention level of the driver as the driver operates the vehicle and generate the alert when the attention level of the driver is determined to be below a minimum attention level threshold or when the distraction level of the driver is determined to be above a distraction level threshold. For example, the determined actions of the driver (e.g., using a mobile device, looking at rearview mirrors, looking at the infotainment system, and the like) may increase or reduce, individually or in combination, the determined attention level of the driver.

That is, through the driver monitoring system, the system may issue a warning or alert (e.g., a chime or warning to the system or driver) with different levels. The alert may comprise an audible alert, a visual alert and/or a haptic alert. For example, the alert may include a chime, warning message on a human machine interface (HMI) such as the infotainment screen or gauge cluster of the vehicle, vibration on the steering wheel and/or seatbelt, and the like. While driving, when the driver receives a call (or texting or social media application notification), the general tendency is for the driver to pick up the phone using one hand and drive the vehicle with the other hand. The system can detect the cellphone and give inputs via the respective alert or indication devices.

With the DMS camera, artificial intelligence trains an algorithm to detect the cellphone near the human ear (both sides). In other words, image data captured by the DMS camera is processed using AI to learn how to determine the behavior of the driver.

Warning indications may be issued when the driver is driving distracted, such as vibrating the steering wheel and seatbelt vibrating, seat vibrating, or indication lamps (e.g., light emitting diodes (LEDs)) or voice messages from speakers in the vehicle.

Many vehicles have features like attending and rejecting the calls or changing the music from the steering wheel or BLUETOOTH™ devices to access cellphone calls. By providing the alert, the system helps the driver become more attentive and take necessary action in order to avoid possible accidents due to distraction, thereby ensuring the safety of the vehicle and passengers.

The system may utilize characteristics of the driver monitoring systems and camera described in U.S. Publication No. US-2023-0353670, which is hereby incorporated herein by reference in its entirety.

The system includes an image processor operable to process image data captured by the camera or cameras, such as for detecting objects or other vehicles or pedestrians or the like in the field of view of one or more of the cameras. For example, the image processor may comprise an image processing chip selected from the EYEQ family of image processing chips available from Mobileye Vision Technologies Ltd. of Jerusalem, Israel, and may include object detection software (such as the types described in U.S. Pat. Nos. 7,855,755; 7,720,580 and/or 7,038,577, which are hereby incorporated herein by reference in their entireties), and may analyze image data to detect vehicles and/or other objects. Responsive to such image processing, and when an object or other vehicle is detected, the system may generate an alert to the driver of the vehicle and/or may generate an overlay at the displayed image to highlight or enhance display of the detected object or vehicle, in order to enhance the driver's awareness of the detected object or vehicle or hazardous condition during a driving maneuver of the equipped vehicle.

The vehicle may include any type of sensor or sensors, such as imaging sensors or radar sensors or lidar sensors or ultrasonic sensors or the like. The imaging sensor or camera may capture image data for image processing and may comprise any suitable camera or sensing device, such as, for example, a two dimensional array of a plurality of photosensor elements arranged in at least 640 columns and 480 rows (at least a 640×480 imaging array, such as a megapixel imaging array or the like), with a respective lens focusing images onto respective portions of the array. The photosensor array may comprise a plurality of photosensor elements arranged in a photosensor array having rows and columns. The imaging array may comprise a CMOS imaging array having at least 300,000 photosensor elements or pixels, preferably at least 500,000 photosensor elements or pixels and more preferably at least one million photosensor elements or pixels arranged in rows and columns. The imaging array may capture color image data, such as via spectral filtering at the array, such as via an RGB (red, green and blue) filter or via a red/red complement filter or such as via an RCC (red, clear, clear) filter or the like. The logic and control circuit of the imaging sensor may function in any known manner, and the image processing and algorithmic processing may comprise any suitable means for processing the images and/or image data.

For example, the control system and/or processing and/or camera and/or circuitry may utilize aspects described in U.S. Pat. Nos. 9,233,641; 9,146,898; 9,174,574; 9,090,234; 9,077,098; 8,818,042; 8,886,401; 9,077,962; 9,068,390; 9,140,789; 9,092,986; 9,205,776; 8,917,169; 8,694,224; 7,005,974; 5,760,962; 5,877,897; 5,796,094; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; 7,859,565; 5,550,677; 5,670,935; 6,636,258; 7,145,519; 7,161,616; 7,230,640; 7,248,283; 7,295,229; 7,301,466; 7,592,928; 7,881,496; 7,720,580; 7,038,577; 6,882,287; 5,929,786 and/or 5,786,772, and/or U.S. Publication Nos. US-2014-0340510; US-2014-0313339; US-2014-0347486; US-2014-0320658; US-2014-0336876; US-2014-0307095; US-2014-0327774; US-2014-0327772; US-2014-0320636; US-2014-0293057; US-2014-0309884; US-2014-0226012; US-2014-0293042; US-2014-0218535; US-2014-0218535; US-2014-0247354; US-2014-0247355; US-2014-0247352; US-2014-0232869; US-2014-0211009; US-2014-0160276; US-2014-0168437; US-2014-0168415; US-2014-0160291; US-2014-0152825; US-2014-0139676; US-2014-0138140; US-2014-0104426; US-2014-0098229; US-2014-0085472; US-2014-0067206; US-2014-0049646; US-2014-0052340; US-2014-0025240; US-2014-0028852; US-2014-005907; US-2013-0314503; US-2013-0298866; US-2013-0222593; US-2013-0300869; US-2013-0278769; US-2013-0258077; US-2013-0258077; US-2013-0242099; US-2013-0215271; US-2013-0141578 and/or US-2013-0002873, which are all hereby incorporated herein by reference in their entireties. The system may communicate with other communication systems via any suitable means, such as by utilizing aspects of the systems described in U.S. Pat. Nos. 10,071,687; 9,900,490; 9,126,525 and/or 9,036,026, which are hereby incorporated herein by reference in their entireties.

The system may utilize aspects of driver monitoring systems and/or head and face direction and position tracking systems and/or eye tracking systems and/or gesture recognition systems. Such head and face direction and/or position tracking systems and/or eye tracking systems and/or gesture recognition systems may utilize aspects of the systems described in U.S. Pat. Nos. 11,518,401; 10,958,830; 10,065,574; 10,017,114; 9,405,120 and/or 7,914,187, and/or U.S. Publication Nos. US-2022-0377219; US-2022-0254132; US-2022-0242438; US-2021-0323473; US-2021-0291739; US-2020-0202151; US-2020-0143560; US-2020-0320320; US-2019-0210615; US-2018-0231976; US-2018-0222414; US-2017-0274906; US-2017-0217367; US-2016-0209647; US-2016-0137126; US-2015-0352953; US-2015-0296135; US-2015-0294169; US-2015-0232030; US-2015-0092042; US-2015-0022664; US-2015-0015710; US-2015-0009010 and/or US-2014-0336876, and/or U.S. patent application Ser. No. 18/508,351, filed Nov. 14, 2023, and/or International Publication Nos. WO 2022/241423, WO 2022/187805 and/or WO 2023/034956, and/or International PCT Application No. PCT/US2023/021799, filed May 11, 2023, which are all hereby incorporated herein by reference in their entireties.

Optionally, the driver monitoring system may be integrated with a camera monitoring system (CMS) of the vehicle. The integrated vehicle system incorporates multiple inputs, such as from the inward viewing or driver monitoring camera and from the forward or outward viewing camera, as well as from a rearward viewing camera and sideward viewing cameras of the CMS, to provide the driver with unique collision mitigation capabilities based on full vehicle environment and driver awareness state. The image processing and detections and determinations are performed locally within the interior rearview mirror assembly and/or the overhead console region, depending on available space and electrical connections for the particular vehicle application. The CMS cameras and system may utilize aspects of the systems described in U.S. Publication Nos. US-2021-0245662; US-2021-0162926; US-2021-0155167; US-2018-0134217 and/or US-2014-0285666, and/or International Publication No. WO 2022/150826, which are all hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A vehicular driver monitoring system, the vehicular driver monitoring system comprising:
   a camera disposed at an interior cabin of a vehicle equipped with the vehicular driver monitoring system, wherein the camera views at least a head region of a driver of the vehicle, and wherein the camera is operable to capture image data;
   wherein the camera comprises a CMOS imaging array having at least one million photosensors arranged in rows and columns;
   an electronic control unit (ECU) comprising electronic circuitry and associated software, wherein the electronic circuitry comprises an image processor for processing image data captured by the camera;
   wherein image data captured by the camera is transferred to and processed at the ECU;
   wherein the vehicular driver monitoring system, based at least in part on processing of image data captured by the camera and transferred to the ECU, determines a current behavior of the driver;
   wherein the vehicular driver monitoring system determines a threshold level of distraction associated with the determined current behavior based at least in part on a current operating condition of the vehicle;
   wherein the vehicular driver monitoring system, while the driver is operating the vehicle, determines that the driver is distracted based on (i) the determined current behavior of the driver and (ii) the determined threshold level of distraction associated with the determined current behavior; and
   wherein, responsive to determination that the driver is distracted, an alert is generated.

2. The vehicular driver monitoring system of claim 1, wherein the determined current behavior of the driver comprises use of a mobile device.

3. The vehicular driver monitoring system of claim 2, wherein the determined current behavior of the driver comprises at least one selected from the group consisting of (i) texting via the mobile device and (ii) making a phone call via the mobile device.

4. The vehicular driver monitoring system of claim 3, wherein the generated alert comprises a first alert and a second alert, and wherein, based on the determined current behavior of the driver comprising making a phone call via the mobile device, the first alert is generated, and wherein, based on the determined current behavior of the driver comprising texting via the mobile device, the second alert is generated, and wherein the second alert is different than the first alert.

5. The vehicular driver monitoring system of claim 1, wherein the generated alert comprises at least one selected from the group consisting of (i) an audio alert played at the interior cabin of the vehicle, (ii) a message displayed at a display device of the vehicle, (iii) illumination of an icon at the interior cabin of the vehicle, (iv) vibration of a driver seat of the vehicle, (v) vibration of a steering wheel of the vehicle and (vi) tightening of a seat belt of the vehicle.

6. The vehicular driver monitoring system of claim 1, wherein the vehicular driver monitoring system is trained using an artificial intelligence (AI) technique to (i) determine the current behavior of the driver and (ii) determine the threshold level of distraction associated with the determined current behavior of the driver.

7. The vehicular driver monitoring system of claim 6, wherein the AI technique comprises processing image data captured by the camera disposed at the interior cabin of the vehicle.

8. The vehicular driver monitoring system of claim 6, wherein the AI technique comprises processing image data captured by another camera of another vehicle.

9. The vehicular driver monitoring system of claim 6, wherein the vehicular driver monitoring system is trained using the AI technique prior to the vehicular driver monitoring system being installed at the vehicle.

10. The vehicular driver monitoring system of claim 6, wherein the vehicular driver monitoring system is trained using the AI technique as the vehicle is operated to travel along a road.

11. The vehicular driver monitoring system of claim 1, wherein, based on the determined current behavior of the driver and the current operating condition of the vehicle, the vehicular driver monitoring system determines a level of distraction for the driver, and wherein the vehicular driver monitoring system determines that the driver is distracted based on the determined level of distraction for the driver being greater than the determined threshold level of distraction.

12. The vehicular driver monitoring system of claim 11, wherein the vehicular driver monitoring system determines (i) a first threshold level of distraction associated with the determined current behavior of the driver and (ii) a second threshold level of distraction associated with the determined current behavior of the driver, and wherein the second threshold level of distraction is different than the first threshold level of distraction, and wherein the generated alert comprises a first alert that is based on the determined level of distraction for the driver being greater than the first threshold level of distraction, and wherein the generated alert comprises a second alert that is based on the determined level of distraction for the driver being greater than the second threshold level of distraction, and wherein the second alert is different than the first alert.

13. The vehicular driver monitoring system of claim 12, wherein the second alert comprises a greater intensity than the first alert.

14. The vehicular driver monitoring system of claim 1, wherein the current operating condition of the vehicle comprises at least one selected from the group consisting of (i) a speed of the vehicle, (ii) an acceleration of the vehicle and (iii) a deceleration of the vehicle.

15. The vehicular driver monitoring system of claim 1, wherein the current operating condition of the vehicle comprises at least one selected from the group consisting of (i) a determined following distance between the vehicle and a leading vehicle, (ii) a determined position of the vehicle within a lane of a roadway in which the vehicle is travelling and (iii) a determined traffic level at or near the vehicle.

16. A vehicular driver monitoring system, the vehicular driver monitoring system comprising:
 a camera disposed at an interior cabin of a vehicle equipped with the vehicular driver monitoring system, wherein the camera views at least a head region of a driver of the vehicle, and wherein the camera is operable to capture image data;
 wherein the camera comprises a CMOS imaging array having at least one million photosensors arranged in rows and columns;
 an electronic control unit (ECU) comprising electronic circuitry and associated software, wherein the electronic circuitry comprises an image processor for processing image data captured by the camera;
 wherein image data captured by the camera is transferred to and processed at the ECU;
 wherein the vehicular driver monitoring system, based at least in part on processing of image data captured by the camera and transferred to the ECU, determines a current behavior of the driver;
 wherein the vehicular driver monitoring system determines a threshold level of distraction associated with the determined current behavior based at least in part on a current operating condition of the vehicle;
 wherein the current operating condition of the vehicle comprises at least one selected from the group consisting of (i) a speed of the vehicle, (ii) an acceleration of the vehicle and (iii) a deceleration of the vehicle;
 wherein, while the driver is operating the vehicle, and based on the determined current behavior of the driver and the current operating condition of the vehicle, the vehicular driver monitoring system determines a level of distraction for the driver;
 wherein the vehicular driver monitoring system determines that the driver is distracted based on the determined level of distraction for the driver being greater than the determined threshold level of distraction associated with the determined current behavior; and
 wherein, responsive to determination that the driver is distracted, an alert is generated.

17. The vehicular driver monitoring system of claim 16, wherein the determined current behavior of the driver comprises use of a mobile device.

18. The vehicular driver monitoring system of claim 17, wherein the generated alert comprises a first alert and a second alert, and wherein, based on the determined current behavior of the driver comprising making a phone call via the mobile device, the first alert is generated, and wherein, based on the determined current behavior of the driver comprising texting via the mobile device, the second alert is generated, and wherein the second alert is different than the first alert.

19. The vehicular driver monitoring system of claim 16, wherein the generated alert comprises at least one selected from the group consisting of (i) an audio alert played at the interior cabin of the vehicle, (ii) a message displayed at a display device of the vehicle, (iii) illumination of an icon at the interior cabin of the vehicle, (iv) vibration of a driver seat of the vehicle, (v) vibration of a steering wheel of the vehicle and (vi) tightening of a seat belt of the vehicle.

20. The vehicular driver monitoring system of claim 16, wherein the current operating condition of the vehicle comprises at least one selected from the group consisting of (i) a determined following distance between the vehicle and a leading vehicle, (ii) a determined position of the vehicle within a lane of a roadway in which the vehicle is travelling and (iii) a determined traffic level at or near the vehicle.

21. A vehicular driver monitoring system, the vehicular driver monitoring system comprising:
 a camera disposed at an interior cabin of a vehicle equipped with the vehicular driver monitoring system, wherein the camera views at least a head region of a driver of the vehicle, and wherein the camera is operable to capture image data;
 wherein the camera comprises a CMOS imaging array having at least one million photosensors arranged in rows and columns;
 an electronic control unit (ECU) comprising electronic circuitry and associated software, wherein the electronic circuitry comprises an image processor for processing image data captured by the camera;
 wherein image data captured by the camera is transferred to and processed at the ECU;
 wherein the vehicular driver monitoring system, based at least in part on processing of image data captured by the camera and transferred to the ECU, determines a current behavior of the driver;
 wherein the vehicular driver monitoring system determines a threshold level of distraction associated with the determined current behavior based at least in part on a current operating condition of the vehicle;
 wherein the vehicular driver monitoring system is trained using an artificial intelligence (AI) technique to (i) determine the current behavior of the driver and (ii) determine the threshold level of distraction associated with the determined current behavior of the driver;
 wherein the determined current behavior of the driver comprises at least one selected from the group consisting of (i) texting via a mobile device and (ii) making a phone call via the mobile device;
 wherein the vehicular driver monitoring system, while the driver is operating the vehicle, determines that the driver is distracted based on (i) the determined current behavior of the driver and (ii) the determined threshold level of distraction associated with the determined current behavior; and
 wherein, responsive to determination that the driver is distracted, an alert is generated.

22. The vehicular driver monitoring system of claim 21, wherein the generated alert comprises a first alert and a second alert, and wherein, based on the determined current behavior of the driver comprising making a phone call via the mobile device, the first alert is generated, and wherein, based on the determined current behavior of the driver comprising texting via the mobile device, the second alert is generated, and wherein the second alert is different than the first alert.

23. The vehicular driver monitoring system of claim 21, wherein the generated alert comprises at least one selected from the group consisting of (i) an audio alert played at the interior cabin of the vehicle, (ii) a message displayed at a display device of the vehicle, (iii) illumination of an icon at the interior cabin of the vehicle, (iv) vibration of a driver seat of the vehicle, (v) vibration of a steering wheel of the vehicle and (vi) tightening of a seat belt of the vehicle.

24. The vehicular driver monitoring system of claim 21, wherein the AI technique comprises processing image data captured by the camera disposed at the interior cabin of the vehicle.

25. The vehicular driver monitoring system of claim 21, wherein the vehicular driver monitoring system is trained using the AI technique prior to the vehicular driver monitoring system being installed at the vehicle.

26. The vehicular driver monitoring system of claim 21, wherein the vehicular driver monitoring system is trained using the AI technique as the vehicle is operated to travel along a road.

27. The vehicular driver monitoring system of claim 21, wherein the current operating condition of the vehicle comprises at least one selected from the group consisting of (i) a speed of the vehicle, (ii) an acceleration of the vehicle and (iii) a deceleration of the vehicle.

28. The vehicular driver monitoring system of claim 21, wherein the current operating condition of the vehicle comprises at least one selected from the group consisting of (i) a determined following distance between the vehicle and a leading vehicle, (ii) a determined position of the vehicle within a lane of a roadway in which the vehicle is travelling and (iii) a determined traffic level at or near the vehicle.

* * * * *